US012186892B2

(12) United States Patent
Strohmayr et al.

(10) Patent No.: US 12,186,892 B2
(45) Date of Patent: Jan. 7, 2025

(54) GRIPPER JAW WITH TACTILE SENSOR AND GRIPPING DEVICE WITH ONE OR MORE SUCH GRIPPER JAWS

(71) Applicant: Tacterion GmbH, Munich (DE)

(72) Inventors: Michael Wolfgang Strohmayr, Augsburg (DE); Holger Urbanek, Munich (DE); Alaa Abdellah, Munich (DE)

(73) Assignee: Tacterion GmbH, Munich (DE)

( * ) Notice: Subject to any disclaimer, the term of this patent is extended or adjusted under 35 U.S.C. 154(b) by 337 days.

(21) Appl. No.: 17/774,942

(22) PCT Filed: Nov. 24, 2020

(86) PCT No.: PCT/EP2020/083158
§ 371 (c)(1),
(2) Date: May 6, 2022

(87) PCT Pub. No.: WO2021/105096
PCT Pub. Date: Jun. 3, 2021

(65) Prior Publication Data
US 2022/0402144 A1    Dec. 22, 2022

(30) Foreign Application Priority Data

Nov. 25, 2019  (DE) .............. 10 2019 131 792.4

(51) Int. Cl.
*B25J 13/08*    (2006.01)
*G01L 1/14*    (2006.01)
*G01L 5/165*    (2020.01)

(52) U.S. Cl.
CPC .......... *B25J 13/082* (2013.01); *B25J 13/084* (2013.01); *G01L 1/146* (2013.01); *G01L 5/165* (2013.01)

(58) Field of Classification Search
CPC ....... B25J 13/082; B25J 13/084; G01L 1/146; G01L 5/165
See application file for complete search history.

(56) References Cited

U.S. PATENT DOCUMENTS

| 2018/0073942 A1 | 3/2018 | Wu et al. |
| 2018/0319016 A1 | 11/2018 | Brocevic et al. |
| 2019/0337160 A1* | 11/2019 | Duchaine ........... G01L 1/20 |

FOREIGN PATENT DOCUMENTS

| DE | 10 2010 034 704 A1 | 2/2012 |
| DE | 10 2016 111 033 A1 | 12/2017 |

(Continued)

OTHER PUBLICATIONS

English-language translation of International Preliminary Report on Patentability issued in International Application No. PCT/EP2020/083158 on Jun. 9, 2022.

(Continued)

*Primary Examiner* — Said Bouziane
(74) *Attorney, Agent, or Firm* — Hoffmann & Baron, LLP

(57) ABSTRACT

A gripper jaw to grip an object, the jaw having a gripping surface with a recess therein, the jaw including: a tactile sensor with a sensor surface and a sensor thickness integrated in the recess in a z-direction, wherein the sensor includes: a base arranged lowermost in the recess, a sensor array arranged on the base with a plurality of taxels being sensitive elements arranged over an area of the base, the taxels configured to detect externally applied forces along the z-direction, wherein each taxel is reversibly deformable, and an elastic layer arranged above and overlapping the array, the layer acting as a mechanical low-pass filter and, in an unloaded state, having a layer thickness, wherein an outwardly facing surface of the layer forms a partial area of the sensor surface, wherein the sensor integrated in the (Continued)

recess projects with the sensor surface beyond the gripping surface in the z-direction.

15 Claims, 1 Drawing Sheet

(56) References Cited

FOREIGN PATENT DOCUMENTS

| DE | 10 2008 042 260 B1 | 11/2018 |
|----|---|---|
| DE | 10 2017 109 487 A1 | 11/2018 |
| DE | 10 2016 206 980 B4 | 12/2018 |
| EP | 3 517 888 A1 | 7/2019 |
| JP | 61-56539 U | 4/1986 |
| JP | 63-251184 A | 10/1988 |

OTHER PUBLICATIONS

Strohmayr M.W. et al. "The DLR artificial skin step II: Scalability as a prerequisite for whole-body covers", 2013 IEEE/RSJ International Conference on Intelligent Robots and Systems (IROS), IEEE, Nov. 3, 2013, pp. 4721-4728.

Design HMI: "Tacterion Sensorskin Flexible Electrodes", Feb. 12, 2018 (Feb. 12, 2018), Retrieved from the Internet: http://www.designhmi.com/2018/02/12/sensorskin-flexible-electrodes/.

Le Thuy-Hong-Loan et al. "A highly sensitive multimodal capacitive tactile sensor", 2017 IEEE International Conference on Robotics and Automation (ICRA), IEEE, May 29, 2017, pp. 407-412.

\* cited by examiner

US 12,186,892 B2

GRIPPER JAW WITH TACTILE SENSOR AND GRIPPING DEVICE WITH ONE OR MORE SUCH GRIPPER JAWS

CROSS-REFERENCE TO RELATED APPLICATIONS

The present application is the U.S. National Phase of PCT/EP2020/083158, filed on 24 Nov. 2020, which claims priority to German Patent Application No. 10 2019 131 792.4, filed on 25 Nov. 2019, the entire contents of which are incorporated herein by reference.

BACKGROUND

Field

The invention relates to a gripper jaw with a tactile sensor, a gripper device with one or more such gripper jaws, and a robot, in particular, a robot manipulator, with at least one such gripper jaw.

Related Art

Robots with a tactile sensor are generally known in the state of the art. For example, DE 10 2017 109 487 A1 reveals a multilayer tactile sensor arranged on a casing of a robot arm, thus forming a touch-sensitive "skin" of the robot arm. DE 10 2016 206 980 B4 discloses a handling device with one or more position-resolving tactile sensors. DE 10 2016 111 033 A1 discloses a capacitive sensor for a gripping or clamping device. DE 10 2008 042 260 B4 discloses a method for flexible handling of objects using a handling device with a tactile touch matrix. EP 3 517 888 A1 discloses a tactile sensor system for an object gripper. US 2018/0073942 A1 discloses a capacitive force/torque sensor.

SUMMARY

The object of the invention is to provide a gripper jaw, a gripper device having the same gripper jaw, and a robot having a gripper jaw that have improved, user-friendly tactile sensing.

The invention results from the features of the independent claims. Advantageous further developments and embodiments are the subject of the dependent claims. Further features, possible applications and advantages of the invention will result from the following description, as well as from the explanation of embodiment examples of the invention, which are shown in the figures.

A first aspect of the invention relates to a gripper jaw for a gripping device having a gripping surface, wherein the gripper jaw has a recess on the gripping surface into which a tactile sensor with a sensor surface and a sensor thickness $D_z$ is replaceably integrated in the z-direction, wherein the z-direction is perpendicular to the sensor surface and perpendicular to the gripping surface in the integrated state of the sensor, and wherein the sensor surface and the gripping surface are arranged essentially parallel:

- a sensor base located lowermost in the recess,
- a sensor array arranged on the sensor base with a plurality of tactilely sensitive sensor elements arranged over an area, so-called taxels $T_{n,m}$, with n=1, 2, ..., N, m=1, 2, ..., M, N>1 and M>1, wherein the taxels $T_{n,m}$ for detecting externally applied forces $F_{ext}$ along the z-direction in an interval: [$zmin_{n,m}$, $zmax_{n,m}$] are elastically reversibly deformable with:

$zmax_{n,m}$: maximum extension of the taxel $T_{n,m}$ in z-direction with no deformation, i.e., $F_{ext}$=0, and $zmin_{n,m}$: minimum extension of the taxel $T_{n,m}$ in z-direction at maximum reversible deformation, i.e., $F_{ext}$>0, and

- an elastic layer ES arranged directly above the sensor array overlaps the sensor array and acts as a mechanical low-pass filter, which in the unloaded state has a layer thickness $D_{ES,unloaded}$ wherein the outwardly facing surface of the elastic layer ES forms at least a partial area of the sensor surface, which sensor integrated in the recess projects with the sensor surface beyond the gripping surface in the z-direction by a height H in the range of at least $D_{ES,unbel}$ to a maximum ($zmax_{n,m}$−$zmin_{n,m}$), wherein H∈[$D_{ES,unbel}$, ($zmax_{n,m}$−$zmin_{n,m}$)].

Advantageously, the tactile sensor integrated in the recess is arranged and dimensioned on the gripper jaw in such a way that, when gripping and/or holding an object and H=0, the gripper jaw simultaneously contacts the object with at least a partial area of the gripping surface and a partial area of the sensor surface.

The tactile sensor is equipped with a sensor array in which the acting forces $F_{ext}$ deform respective taxels $T_{n,m}$ whereby the deformation is measured and whereby the greater the force, the greater the deformation of the taxel. Such sensors are generally known in the state of the art.

The proposed gripper jaw advantageously enables a mechanically uncomplicated replacement of the entire tactile sensor of the gripper jaw. The recess on the gripper surface is advantageously designed with a corresponding mechanism adapted to the sensor or sensor housing, so that the active sensor can be replaced easily. This mechanism can be a click mechanism or clamp mechanism or a corresponding quick-screw mechanism, etc. Of course, further designs of the recess, as well as of the housing of the sensor, which allow a position-exact integration of the sensor into the gripper jaw and an uncomplicated exchangeability of the sensor, are included in the idea of the invention.

Furthermore, the proposed gripper jaw advantageously enables uncomplicated replacement of the elastic layer ES, which on the one hand acts as a mechanical low-pass filter and on the other hand protects the sensor array, i.e., in this respect also serves as a protective layer and thus increases the service life of the sensor array or the individual taxels. Advantageously, the elastic layer ES is fixed in a frame and the frame is exchangeably attached to the sensor or sensor housing, so that the elastic layer ES together with the frame can be exchanged. Of course, other mechanical realizations are also included in the idea of invention.

Further advantageously, the proposed gripper jaw enables a significant increase in the service life of the tactile sensor, in that due to the described elevation H of the sensor surface over the gripping surface, the deformation of the individual taxel $T_{n,m}$ is limited to the maximum possible reversible deformation $zmax_{n,m}$−$zmin_{n,m}$=$\Delta zmax_{reversible}$ of the taxel $T_{n,m}$, wherein provided that the height H through an object becomes zero: H=0, then the gripping or holding of an object is done by the advantageously rigid gripping surface of the gripper. As a consequence, the tactile sensor can only detect acting forces $F_{ext}$ whose maximum detectable magnitude |$F_{ext}$| is reached when H=0.

The part of the tactile sensor that projects over the gripping surface is covered by the elastic layer ES and the taxel $T_{n,m}$ is formed.

Particularly advantageously, H is chosen from the following range: H∈[($\Delta zmax_{reversible}$)*0.25, $\Delta zmax_{reversible}$] or H∈[($\Delta zmax_{reversible}$)*0.5, ($\Delta zmax_{reversible}$)*0.9] or H∈[($\Delta zmax_{reversible}$)*0.5, ($\Delta zmax_{reversible}$)*0.75].

A continuous further development of the proposed gripper jaw is characterized in that the gripper jaw has a number P of the recesses, each with tactile sensors replaceably integrated therein. In particular, it is possible to equip the gripping surface with several tactile sensors as described above. Depending on the object, the height H can be identical or different for all these clocked sensors.

The gripping surface is advantageously flat. In this case, the sensor surface is also flat. Depending on the objects typically to be gripped, the gripper jaw is advantageously designed to correspond to the object geometry of the object. In this case, the sensor surface is advantageously also adapted to the corresponding object geometry of the object, so that even with a three-dimensionally shaped gripping surface, a height H results with which the sensor surface protrudes above the surrounding gripping surface.

The gripper jaw advantageously consists of a metal, a metal alloy, a fiber composite, a ceramic material, a hard plastic, in particular, thermoset, or a combination thereof. The rigidity of the gripper jaw material is advantageously determined by the corresponding task and is selected accordingly.

An advantageous further development of the gripper jaw is characterized in that the tactile sensor includes a resistive and a capacitive sensor part, wherein external forces $F_{ext}$ act on the sensor surface on the one hand and electrical capacitance measurement data on the other. For this purpose, the tactile sensor has at least one electrical conductor built into the sensor.

In an advantageous embodiment, an electrical conductor is integrated into the elastic layer ES. Advantageously, the electrical conductor is designed as a flat conductive layer or as a single conductor that is integrated in a meandering manner in the elastic layer ES. This electrical conductor advantageously allows resistive measurements to determine breaks in electrical conduction and/or capacitance measurements, for example, to determine electrical coupling of the tactile sensor to an environment. This can be used to determine a distance to an adopting object and/or to determine, for example, a material in the vicinity of the sensor.

Advantageously, the recess on the gripper jaw has a first interface for electrical contact with an associated second interface of the tactile sensor. In the integrated state of the sensor, electrical signals can thus be transmitted from the sensor array to an evaluation unit. Furthermore, bidirectional data and/or signal lines and/or a power supply can advantageously be provided at the sensor.

The sensor is advantageously surrounded by a housing, apart from the sensor surface. Advantageously, the sensor base is formed by the bottom of a pot-shaped sensor housing. The housing advantageously has a mechanism for uncomplicated removal and installation of the sensor in the gripper jaw. Further advantageously, the housing has the aforementioned second electrical interface for electrical contacting of the sensor.

The taxels $T_{n,m}$ in the sensor array are advantageously arranged in an orthogonal pattern of a number of N rows and a number of M columns. Of course, any other arrangements of the taxels $T_{n,m}$ to form a sensor array are also covered by the idea of the invention.

An advantageous further development of the proposed gripper jaw is characterized by the fact that a surface of the elastic layer ES facing into the interior of the sensor has in each case an elevation $EH_{n,m}$ at its positions opposite to the respective taxel $T_{n,m}$ which applies external forces $F_{ext}$ applied to the layer ES locally to the respective taxel $T_{n,m}$ wherein the elevation $EH_{n,m}$ in its lateral cross section $Q_{EHn,m}$ does not exceed the lateral cross section of the associated taxels $T_{n,m}$ in each case.

These elevations $EH_{n,m}$ thus have the function or task of a force conduction or force concentration on the respective taxels $T_{n,m}$.

Advantageously, all elevations $EH_{n,m}$ have an identical longitudinal section $L_{EHn,m}$ in the form of a square or a rectangle or a triangle or a quadrilateral or a pentagon or a hexagon or a semicircle or a half-ellipse.

As an alternative to the above mentioned elevations $EH_{n,m}$, i.e., the one-sided structuring of the elastic layer ES, an advantageous further development of the proposed gripper jaw is characterized by the fact that between a surface of the elastic layer ES facing into the interior of the sensor and the respective taxel $T_{n,m}$ in each case a spacer $AH_{n,m}$ is arranged, which applies external forces $F_{ext}$ applied to the layer ES locally to the respective taxel $T_{n,m}$ wherein the spacers $AH_{n,m}$ in their lateral cross section $Q_{AHn,m}$ do not exceed the lateral cross-section of the associated taxel $T_{n,m}$ in each case. Analogous to the above, the spacers $AH_{n,m}$ advantageously have an identical longitudinal section $L_{AHn,m}$ in the form of a square or a rectangle or a triangle or a quadrilateral or a pentagon or a hexagon or a semicircle or a half-ellipse.

Both the elevations $EH_{n,m}$ as well as the spacers $AH_{n,m}$ increase the sensitivity and accuracy of the tactile sensor, as they increase the applied force $F_{ext}$ on the nearest taxel/taxels, thus ensuring that the force $F_{ext}$ is not supported/diverted via non-sensitive structures. The shape of the elevations $EH_{n,m}$ as well as the spacers $AH_{n,m}$ also influences a measured value characteristic curve ($F_{ext}$ to the generated measured value of the taxel $T_{n,m}$) of the tactile sensor. By appropriate shaping of the elevations $EH_{n,m}$ as well as the spacers $AH_{n,m}$ an optimization of the measured value characteristic can be implemented for a specific task, in particular, a linearization of the measured value characteristic curve.

The elastic layer ES is advantageously designed to be stiff so that when an external force $F_{ext}$ is applied at any position on the surface of the elastic layer ES overlapping the sensor array, at least two taxels $T_{n,m}$ or, advantageously, the nearest neighboring taxel $T_{n,m}$ or advantageously the nearest and next-but-one neighboring taxel $T_{n,m}$ or advantageously the nearest and the next but one and the next but one neighboring taxel $T_{n,m}$ are deformed. Advantageously, the elastic layer ES is made as thin as possible, wherein different streaks of the elastic layer ES are achieved by different material choices. The elastic layer ES thus acts as a low-pass filter, i.e., it is designed to be so stiff that an applied force $F_{ext}$ is always applied to several taxels $T_{n,m}$ distributed. Thus, by a calculation of the center of gravity of the applied pressure, the contact point of the applied force $F_{ext}$ can be calculated.

In an advantageous further development, the position centroids are not distributed over all taxels $T_{n,m}$ but a partitioning is carried out, i.e., an exclusive partitioning of the taxel $T_{n,m}$ into exclusive groups. In this case, each taxel $T_{n,m}$ is uniquely assigned to a group. Instead of an explicit partitioning of the taxel $T_{n,m}$ a weighting of the membership to given groups is also possible.

In order to reduce a required gripping or holding force for gripping or holding an object, the elastic layer ES on the sensor surface can be designed in a structured manner, for example, it can have a rubber coating, which increases the riding coefficient and allows objects to be gripped more securely.

Another aspect of the present invention relates to a gripping device having one, two or more gripper jaws as described above.

The gripping device is advantageously characterized in that the gripper jaws are each driven by at least one actuator and the actuators are controlled by a control unit, wherein the control unit is designed to determine a desired movement of the gripper jaws taking into account measured values of the tactile sensor or sensors in the respective gripper jaws, and to control the actuators in order to implement the desired movement.

Advantageously, the gripper device is characterized in that an evaluation unit is provided, which is connected to the tactile sensor and which determines on the basis of values determined by the taxel $T_{n,m}$ a sub-taxel accurate position $POS_{Fext(t)}$ of the force input $F_{ext}(t)$ on the sensor surface and the force amount $|F_{ext}(t)|$. Determining the sub-taxel position $POS_{Fext(t)}$ is advantageously done by appropriate weighting of the current measurement data of the taxel $T_{n,m}$.

An advantageous further development of the proposed gripping device is characterized in that the evaluation unit is connected to the electrical conductor in the elastic layer ES and the evaluation unit uses the electrical conductor to determine a capacitive coupling of the sensor with an environment of the tactile sensor.

An advantageous further development of the proposed gripping device is characterized in that the evaluation unit is connected to the electrical conductor in the elastic layer ES and the evaluation unit uses the electrical conductor to determine a wear of the elastic layer ES. For this purpose, a voltage/current is applied, for example, to the electrical conductor. If the elastic layer ES is damaged, a meandering electrical conductor is, for example, interrupted, which can be easily determined by a corresponding change in voltage/current. If such a change is detected, a warning signal is advantageously generated and issued by the evaluation unit, so that a user is prompted to replace the tactile sensor or only the elastic layer ES.

Corresponding signs of wear of the elastic layer ES can advantageously also be detected by changes in the capacitive coupling.

An advantageous further development of the proposed gripping device is characterized in that the evaluation unit is set up, on the basis of a determined subaxially accurate position $POS_{Fext(t)}$ and an amount $|F_{ext}(t)|$ of a force input $F_{ext}(t)$ on the sensor surface to determine and issue an orientation of a known object held by the gripper jaws.

Another aspect of the present invention relates to a robot, in particular, a robotic manipulator, including a gripping device as described above.

Further advantages, features and details result from the following description, in which—possibly with reference to the drawings—at least one embodiment example is described in detail. Identical, similar and/or functionally identical parts are provided with the same reference numerals.

DETAILED DESCRIPTION

Figures 1A, 1B:
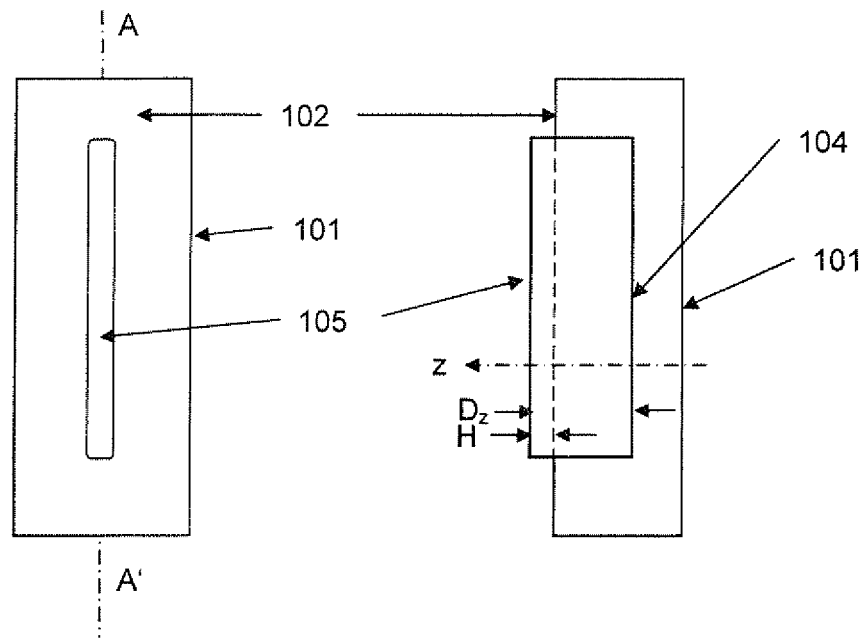
FIG. 1a shows a highly schematic top view of the gripping surface 102 or the sensor surface 105 of a gripper jaw 101 according to the invention.
FIG. 1b shows a highly schematized cross-sectional view along a line of intersection A-A' through a gripper jaw 101 according to the invention.

FIG. 1a shows a highly schematized top view of the gripping surface 102 or the sensor surface 105 of a gripper jaw 101 according to the invention. Referring to FIG. 1a, the sensor surface 105 is elongated and narrow compared to the gripping surface 102. Both the sensor surface 105 and the gripping surface 102 are flat.

FIG. 1b shows a highly schematized cross-sectional view along a line of intersection A-A' through a gripper jaw 101 according to the invention. Shown is the tactile sensor 104 integrated into a recess of the gripper jaw 101. It can further be seen from FIG. 1a that the sensor 104 integrated in the recess with the sensor surface 105 protrudes beyond the gripping surface 102 in the z-direction by a height H. The sensor 104 itself has a thickness in the z-direction $D_z$.

Figure 2:
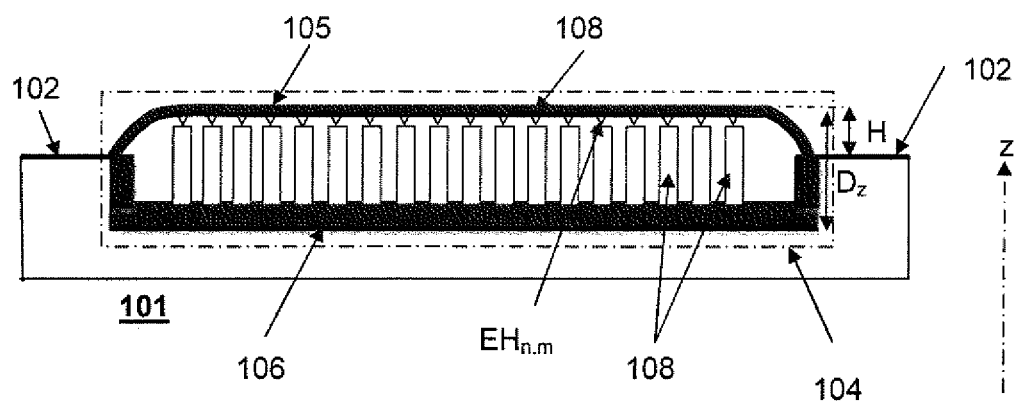
FIG. 2 shows a schematized cross-sectional view along section line A-A' through a gripper jaw 101 according to the invention.

FIG. 2 also shows a schematized cross-sectional view along the line of intersection A-A' through a gripper jaw 101 for a gripping device according to the invention. The gripper jaw 101 has a gripping surface 102 and is characterized by the following features.

The gripper jaw 101 has a recess on the gripping surface 102 into which a tactile sensor 104 having a sensor surface 105 and a sensor thickness $D_z$ is replaceably integrated in the z-direction, wherein the z-direction is perpendicular to the sensor surface 105 and perpendicular to the gripping surface 102 in the integrated state of the sensor 104, and wherein the sensor surface 105 and the gripping surface 102 are arranged substantially parallel.

The tactile sensor 104 has: a sensor base 106 arranged at the bottom of the recess, which in the present case is formed by the bottom of a housing of the sensor 104, a sensor array arranged on the sensor base 106 and having a plurality of tactilely sensitive sensor elements arranged over an area, so-called taxels $T_{n,m}$ 108, with n=1, 2, . . . , N, m=1, 2, . . . , M, N>1 and M>1, wherein the taxels $T_{n,m}$ 108 for the detection of externally applied forces $F_{ext}$ along the z-direction in an interval: [$zmin_{n,m}$, $zmax_{n,m}$] are elastically reversibly deformable with:

$zmax_{n,m}$: maximum extension of the taxel $T_{n,m}$ 108 in z-direction with no deformation, i.e., $F_{ext}=0$ and $zmin_{n,m}$: minimum extension of the taxel $T_{n,m}$ 108 in z-direction at maximum reversible deformation, i.e., $F_{ext}>0$, and an elastic layer ES 108 arranged directly above the sensor array overlaps the sensor array and acts as a mechanical low-pass filter, which in the unloaded state has a layer thickness $D_{ES,unloaded}$ wherein the outwardly facing surface of the elastic layer ES 108 forms at least a partial area of the sensor surface 105.

The sensor 104 integrated in the recess projects with the sensor surface 105 beyond the gripping surface 102 in the z-direction by a height H in the range of at least $D_{ES,unbel}$ to a maximum ($zmax_{n,m}-zmin_{n,m}$), wherein H∈[$D_{ES,unbel}$, ($zmax_{n,m}-zmin_{n,m}$)].

The tactile sensor 104 integrated in the recess is arranged and dimensioned on the gripper jaw 101 in such a way that the gripper jaw 101, when gripping and/or holding an object, contacts the object with at least a partial area of the gripping surface 102 and a partial area of the sensor surface 105 simultaneously.

A surface of the elastic layer ES 108 facing into the interior of the sensor 104 at its positions opposite to the respective taxels $T_{n,m}$ has an elevation $EH_{n,m}$ which applies external forces $F_{ext}$ to the layer ES 108 locally to the respective taxels $T_{n,m}$ and therefore serve as force concentrators, wherein the elevation $EH_{n,m}$ in its lateral cross section $Q_{EHn,m}$ does not exceed the lateral cross section of the associated taxel $T_{n,m}$ in each case. In the present case, all elevations $EH_{n,m}$ have an identical longitudinal section $L_{EHn,m}$ in the form of a triangle, whose bases are in contact with the inwardly facing surface of the elastic layer ES 108 and the tips of which are in contact with the taxel $T_{n,m}$ respectively.

Although the invention has been further illustrated and explained in detail by example embodiments, the invention is not limited by the disclosed examples and other variations may be derived therefrom by a person skilled in the art without departing from the scope of protection of the invention. It is therefore clear that a wide range of variations exists. It is also clear that example embodiments are really only examples which are not to be understood in any way as limiting, for example, the scope of protection, the possibilities of use or the configuration of the invention. Rather, the preceding specification and the figure description enable the person skilled in the art to implement the example embodiments in a concrete manner, wherein the person skilled in the art, being aware of the disclosed inventive idea, can make a variety of changes for example with respect to the function or the arrangement of individual elements mentioned in an example embodiment, without leaving the scope of protection defined by the claims and their legal equivalents, such as further explanations in the specification.

LIST OF REFERENCE NUMERALS

101 Gripper jaw
102 Gripping surface
104 Tactile sensors
105 Sensor surface
106 Sensor base
108 Sensor elements, taxel $T_{n,m}$

The invention claimed is:

1. A gripper jaw to grip an object, the gripper jaw having a gripping surface with a recess therein, the gripper jaw comprising:
a tactile sensor comprising a sensor surface and a sensor thickness $D_z$, the tactile sensor replaceably integrated in the recess in a z-direction, wherein the z-direction in an integrated state of the tactile sensor is perpendicular to the sensor surface and perpendicular to the gripping surface, and wherein the sensor surface and the gripping surface are arranged in parallel, wherein the tactile sensor comprises:
i. a sensor base located lowermost in the recess,
ii. a sensor array arranged on the sensor base with a plurality of taxels $T_{n,m}$, the taxels $T_{n,m}$ being tactilely sensitive sensor elements that are arranged over an area of the sensor base, with n=1, 2, ..., N, m=1, 2, ..., M, N>1 and M>1, wherein the taxels $T_{n,m}$ are configured to detect externally applied forces $F_{ext}$ along the z-direction in an interval: [$zmin_{n,m}$, $zmax_{n,m}$], wherein each taxel of the taxels $T_{n,m}$ is elastically reversibly deformable with:
$zmax_{n,m}$: maximum extension of the taxel in the z-direction with no deformation, $F_{ext}=0$,
$zmin_{n,m}$: minimum extension of the taxel in the z-direction at maximum reversible deformation, $F_{ext}>0$, and
iii. an elastic layer ES arranged directly above the sensor array and overlapping the sensor array, the elastic layer ES acting as a mechanical low-pass filter, wherein the elastic layer ES, in an unloaded state, has a layer thickness $D_{ES,unloaded}$, wherein an outwardly facing surface of the elastic layer ES forms at least a partial area of the sensor surface, and
wherein the tactile sensor integrated in the recess projects with the sensor surface beyond the gripping surface in the z-direction by a height H in a range of at least $D_{ES,unbel}$ to a maximum ($zmax_{n,m}-zmin_{n,m}$): H $\in$ [$D_{ES,unbel}$, ($zmax_{n,m}-zmin_{n,m}$)], and wherein the tactile sensor integrated in the recess is arranged and dimensioned on the gripper jaw in such a way that, when gripping and/or holding the object and H=0, the gripper jaw simultaneously contacts the object with at least a partial area of the gripping surface and the partial area of the sensor surface.

2. The gripper jaw according to claim 1, wherein the tactile sensor comprises a resistive sensor part and a capacitive sensor part, wherein the tactile sensor is capable of capturing external forces $F_{ext}$ acting on the sensor surface with the resistive part, and is capable of capturing electrical capacitance measurement data with the capacitive part.

3. The gripper jaw according to claim 1, an inwardly facing surface of the elastic layer ES facing into an interior of the sensor has in each case an elevation $EH_{n,m}$ at its positions opposite respective taxels $T_{n,m}$, wherein the elevation concentrates the externally applied forces $F_{ext}$ that are applied to the layer ES locally to the respective taxels $T_{n,m}$, wherein the elevation $EH_{n,m}$ in its lateral cross section $Q_{EHn,m}$ does not exceed a lateral cross section of associated taxels $T_{n,m}$ in each case.

4. The gripper jaw according to claim 3, wherein all elevations $EH_{n,m}$ have an identical longitudinal section $LEH_{n,m}$ in a form of a square, a rectangle, a triangle, a quadrilateral, a pentagon, or a hexagon.

5. The gripper jaw according to claim 1, wherein between an inwardly facing surface of the elastic layer ES facing into an interior of the tactile sensor and a respective taxel $T_{n,m}$ a spacer $AH_{n,m}$ is arranged in each case, wherein the spacer $AH_{n,m}$ concentrates the externally applied forces $F_{ext}$ applied to the layer ES locally to the respective taxel $T_{n,m}$, wherein spacers $AH_{n,m}$ in their lateral cross section $QA_{Hn,m}$ do not exceed a lateral cross-section of an associated taxel Tom in each case.

6. The gripper jaw according to claim 5, wherein all spacers $AH_{n,m}$ have an identical longitudinal section $LA_{Hn,m}$ in a form of a square, a rectangle, a triangle, a quadrilateral, a pentagon, or a hexagon.

7. The gripper jaw according to claim 1, wherein the elastic layer ES is designed to be rigid such that, when an externally applied force $F_{ext}$ is applied at a position of the surface of the elastic layer overlapping the sensor array, at least two taxels $T_{n,m}$ are deformed.

8. The gripper jaw according to claim 1, wherein the elastic layer ES is fixed in a frame and the frame is replaceably attached to the sensor.

9. The gripper jaw according to claim 1, wherein an electrical conductor is meanderingly integrated into the elastic layer.

10. A gripping device comprising:
one or more gripper jaws according to claim 1;
at least one actuator for each of the one or more gripper jaws, the at least one actuator configured to drive each of the one or more gripper jaws; and
a control unit configured to control one or more actuators of the one or more gripper jaws, wherein the control unit is configured to determine a desired movement of the one or more gripper jaws taking into account measured values of the tactile sensor, and to control the one or more actuators of the one or more gripper jaws in order to implement the desired movement.

11. The gripping device according to claim 10, further comprising an evaluation unit connected to the tactile sensor, the evaluation unit configured, based on values determined by a taxel $T_{n,m}$, to determine a sub-taxel accurate position of an externally applied force $F_{ext}(t)$ on the sensor surface and a force amount $|F_{ext}(t)|$ of the externally applied force $F_{ext}(t)$.

12. The gripping device according to claim 11, wherein the evaluation unit is connected to an electrical conductor of the elastic layer ES, wherein the evaluation unit is configured to use the electrical conductor to determine a capacitive coupling of the sensor with an environment of the sensor.

13. The gripping device according to claim 11, wherein the evaluation unit is connected to an electrical conductor of the elastic layer, and evaluation unit is configured to use the electrical conductor to determine a wear of the elastic layer ES.

14. The gripping device according to claim 11, wherein the evaluation unit is configured to determine and issue, based on a determined sub-taxel-precise position $POS_{Fext}(t)$ and the amount $|F_{ext}(t)|$ of the externally applied $F_{ext}(t)$ on the sensor surface, an orientation of a known object held by the one or more gripper jaws.

15. A robot comprising a robot manipulator with a gripper jaw according to claim 1.

* * * * *